W. W. WINTER & T. MUELLER.

Umbrellas.

No. 5,215.

Reissued Dec. 31, 1872.

Witnesses { Thomas McIlvain
Harry Smith

William W. Winter
and Theodore Mueller
by their Attys.
Howson and Son

UNITED STATES PATENT OFFICE.

WILLIAM W. WINTER AND THEODORE MUELLER, OF PHILADELPHIA, PENNSYLVANIA, ASSIGNORS TO COMEGYS LUSBY.

IMPROVEMENT IN UMBRELLAS.

Specification forming part of Letters Patent No. 76,129, dated March 31, 1868; reissue No. 5,215, dated December 31, 1872.

*To all whom it may concern:*

Figure 2:
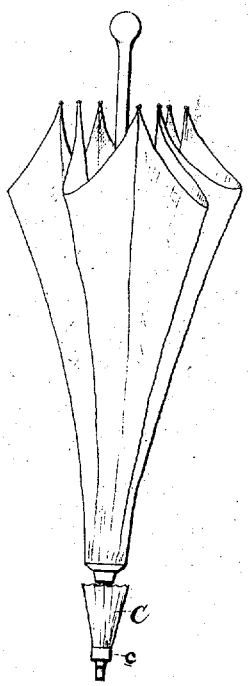

Be it known that we, WILLIAM W. WINTER and THEODORE MUELLER, of Philadelphia, county of Philadelphia, State of Pennsylvania, have invented an Improvement in Umbrellas, of which the following is a specification:

The object of our invention is to catch the water as it drips from the folds of a recently-used umbrella; and this object we attain by means of a cup, C, Figure 2, which is attached to the stick of the umbrella, and which can be expanded when its services are demanded, and contracted when its use is not required.

Figure 1:
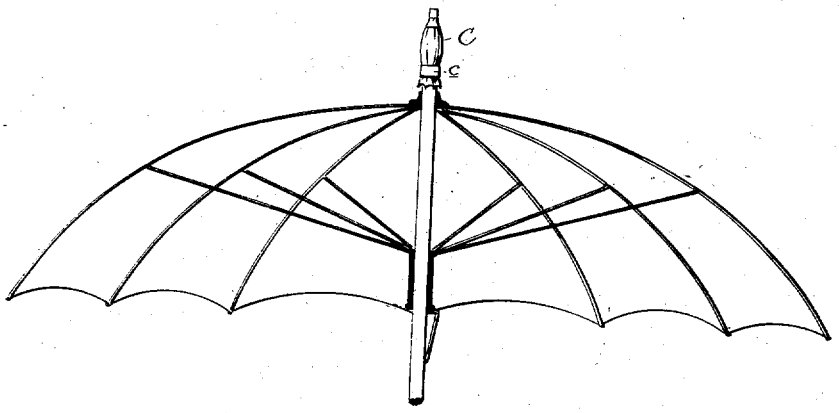
Figure 3:
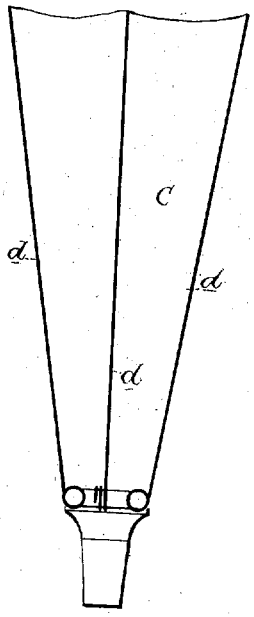

The cup C is made of suitable fabric, connected to ribs *d d*, Fig. 3, the tendency of which is to move outward and to expand the cup to an extent permitted by the fabric, as shown in Figs. 1 and 3, this expansile property of the cup being effected in the present instance by coiling the ends of the ribs and so attaching them to a ring on the stick that they become springs.

When the drip-cup is not required for use it may be contracted and closed by simply sliding a ring, *c*, toward the ends of the ribs.

We claim as our invention—

1. The combination, with an umbrella, substantially as described, of a drip-cup, which admits of being expanded and contracted, as set forth.

2. The drip-cup, consisting of fabric attached to ribs rendered elastic by coiling their lower ends, as set forth.

3. The combination of the self-expanding drip-cup with the closing-ring *c*.

In testimony whereof we have signed our names to this specification in the presence of two subscribing witnesses.

WILLIAM W. WINTER.
TH. MUELLER.

Witnesses:
WM. A. STEEL,
HARRY SMITH.